July 15, 1958 T. F. KNAPP ET AL 2,843,770

RADIO NOISE FILTER ASSEMBLY FOR DYNAMO ELECTRIC MACHINE

Filed Sept. 26, 1955 2 Sheets-Sheet 1

INVENTORS
Clarence H. Boyd
BY Theodore F. Knapp
Leonard S. Knopfell
Attorney

RADIO NOISE FILTER ASSEMBLY FOR DYNAMO ELECTRIC MACHINE

Filed Sept. 26, 1955 2 Sheets-Sheet 2

INVENTORS
Clarence H. Boyd
Theodore F. Knapp
BY [signature]
Attorney 2,843,770
Patented July 15, 1958

2,843,770

RADIO NOISE FILTER ASSEMBLY FOR DYNAMO ELECTRIC MACHINE

Theodore F. Knapp and Clarence H. Boyd, Grand Rapids, Mich., assignors to Lear, Incorporated, Grand Rapids, Mich.

Application September 26, 1955, Serial No. 536,517

10 Claims. (Cl. 310—72)

This invention has reference to circuits and the components thereof designed to filter electrical motor "noise" to prevent or minimize interference with radio communication or other equipment whose operation may be deleteriously affected thereby. In another aspect the invention comprehends a novel process for fabricating the improved filter assembly.

Such filters find a wide field of application aboard aircraft, particularly in connection with electro-mechanical actuators for moving cowl flaps, wing surfaces, etc. Obviously, space is frequently at a premium and the condensation of such actuators into minimum volume has presented a continuing challenge to workers in this art. Heretofore radio noise filters have been recognized as a necessary appendage to the electric motor of the actuator and have invariably been housed in a container mounted upon the exterior of the actuator. The increase in dimensions thereby introduced constitutes a detriment.

Accordingly, the principal object of this invention is to provide a radio noise filter assembly arranged to fit within the housing of the electric motor and to occupy space heretofore serving no useful purpose.

Another object is to provide a filter as aforesaid of unitary construction arranged to be electrically interconnected with the motor wiring with a minimum of complexities.

Still other objects reside in a filter assembly in accordance with the foregoing objects which is efficient, rugged, easily manufactured, proof against deterioration by virtue of heat, lubricants, fungus or other injurious factors, light in weight, compact and low in cost.

Other objects will become apparent from the ensuing description which, taken together with the accompanying drawings, discloses a preferred embodiment of the invention.

Figure 8A:
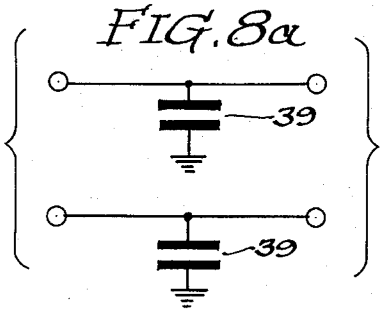
Figure 8B:
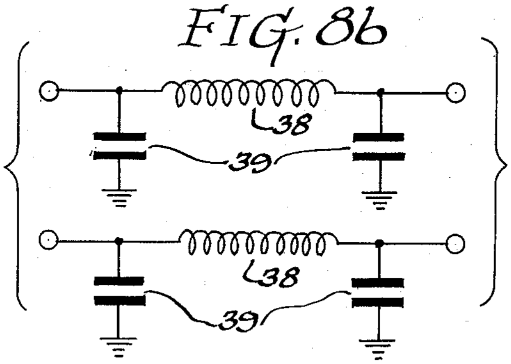
Figure 8C:
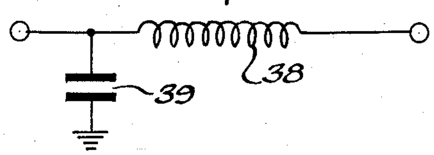

Figs. 8*a*, 8*b* and 8*c* are circuit diagrams of various combinations of filter components to which the invention lends itself.

Regarded broadly the invention comprehends the provision of a casing of insulating material conformed generally cylindrically to fit within the housing of an electric motor adjacent one end of the armature and field and about the shaft. The choke coils and capacitors forming a part of the filter per se are mounted within the casing and are arcuate in form to surround the shaft and thereby require minimum space and, when considered in an axial sense, the coils and capacitors are positioned mutually adjacently. A novel arrangement of terminal prongs and receptacle is provided to facilitate interconnection of the filter assembly to the motor windings.

In another aspect the invention includes a novel process for integrating the several components of the filter assembly into a rigid, hermetically sealed unit.

Figure 1:
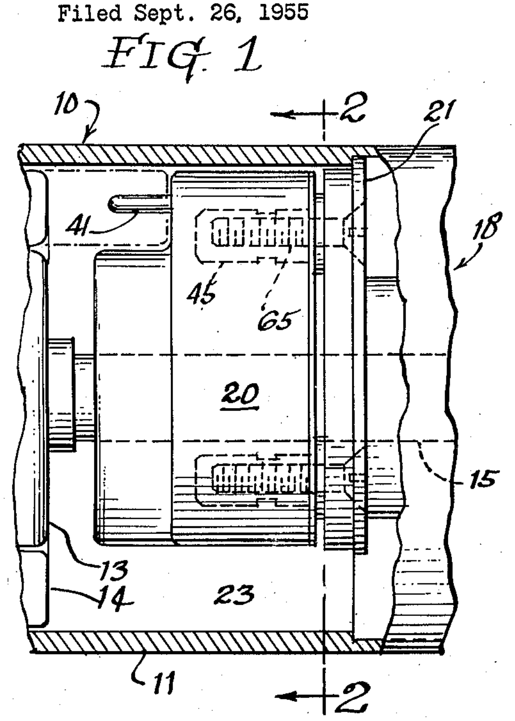
Fig. 1 shows a side elevation, partly sectioned, of our improved filter in a typical environment.

Turning now to the drawings, Fig. 1 illustrates an electric motor 10 such as may be the prime mover of an electro-mechanical actuator including a housing 11, armature 13 and field 14. The armature shaft 15 may extend into an electro-magnetic clutch assembly indicated generally at 18 or may simply be carried on a bearing in an end bell of suitable form. In the embodiment shown bearing support is provided on a bracket plate 21 fixed to the motor housing 11 in any desired manner. Bracket plate 21 also serves to support the filter assembly in a manner to be subsequently detailed.

Bracket 21, housing 11, field 14, armature 13 and armature shaft 15 define an annular space 23 within which the invention assembly 20 is adapted to fit. In the case of a motor having an end bell of conventional form the same will be understood as being the equivalent of the bracket plate 21 insofar as concerns the instant invention.

Figure 3:
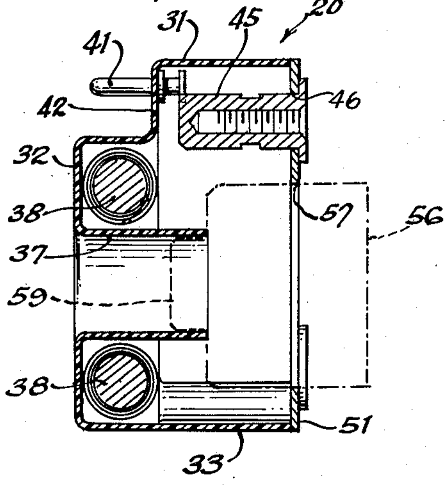
Fig. 3 is a medial cross section of the filter alone prior to introduction of the potting compound.
Figure 4:
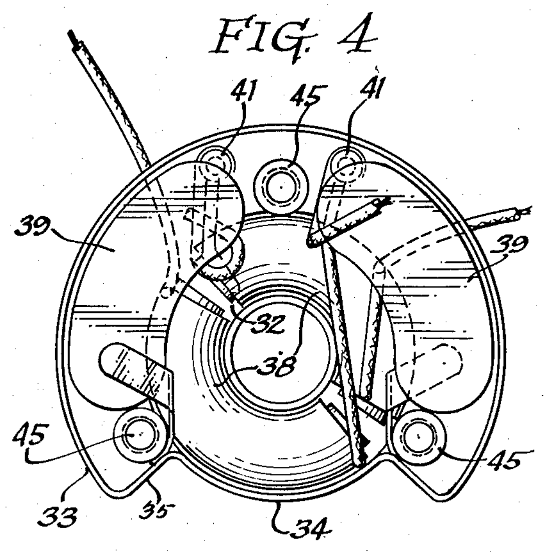
Fig. 4 is an end elevational view from the right of the assembly as seen in Fig. 3.
Figure 6:
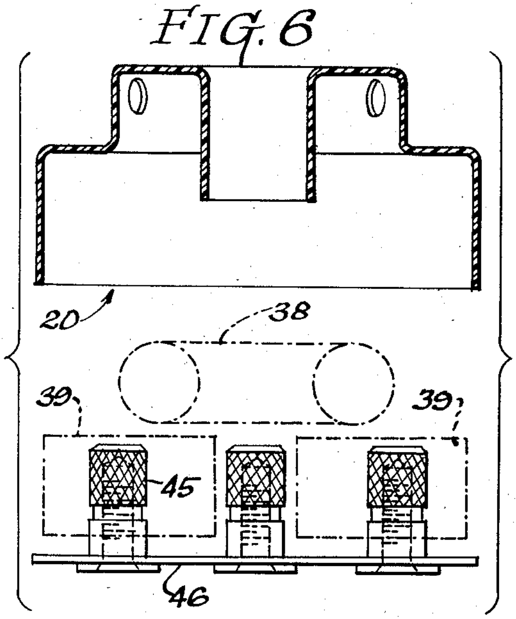
Fig. 6 is a cross section of the casing of Fig. 5 and of other parts in exploded relation thereto.
Figure 5:
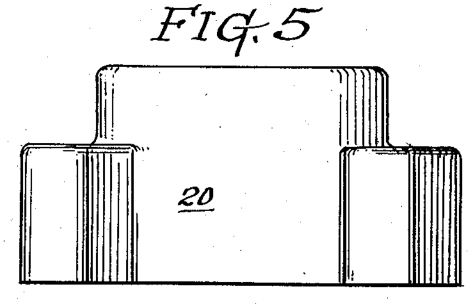
Fig. 5 shows a bottom elevation of the filter casing.

Referring to Figs. 3 and 4 particularly, the assembly 20 comprises a casing 31 which includes two cojoined cup-shaped parts 32 and 33, the latter of which may be indented arcuately as at 34 to provide a passage for electrical leads, if desired. The deformed cup-shaped portion 33, including its rim 35, thus remaining will sometimes, for convenience, be referred to hereinafter as segmentally toroidal. Portion 32 includes a central hollow, inward extension 37 for passage of the armature shaft 15.

Positioned in the cup 32 is one or more choke coils or inductors 38, each uniform or segmentally toroidal in form for economical utilization of the available space, while within the cup 33 there is positioned one or more capacitors 39, which may also be similar in form to the inductors to fit economically within the assigned space. Each of the several terminals of the inductors and capacitors are suitably interconnected within or without the casing 20 but, since the circuit arrangement may vary, i. e. assume one of the exemplificative forms shown in Figures 8*a*, 8*b*, or 8*c*, elaboration of such connections may be dispensed with. In any case the leads which connect to the motor field are preferably brought out through prongs 41—41 carried in the floor 42 of the cup 33. Such prongs engage with mating female members (not shown) connected to the field winding 14 in the desired circuit arrangement (Fig. 1).

Figure 7:
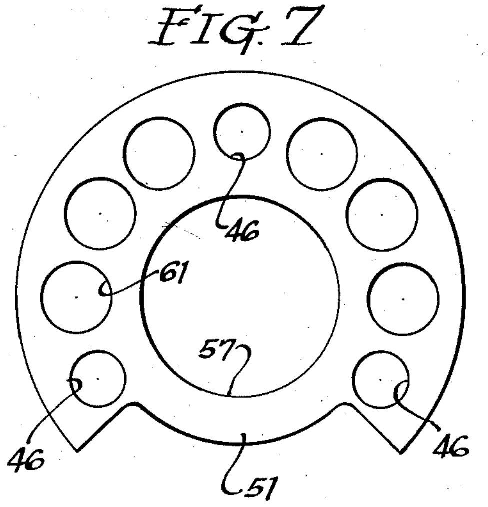
Fig. 7 is a detail in elevation of the end plate of the assembly.

Support for the assembly is provided through the medium of a plurality of threaded inserts 45 located in apertures 46 in a substantially annular disc 51 (Fig. 7) of electrically conducting material having a contour corresponding to the rim of the casing 20 and providing a common ground connection for the electrical components. Inserts 45 are a tight fit in apertures 46 in order to retain them in proper position pending the potting operation to be described.

Desirably the inductors and capacitors are first assembled on the disc 51 and this sub-assembly incorporated with the casing 20. By providing suitably rigid conductors and terminals the several components may be made to retain their proper positions on the disc 51 pending final assembly. Inasmuch as the electrical components and their leads are rendered accessible from all sides while outside the casing 20 a substantial saving in manufacturing cost is realized, as compared to the case where assembly of the components and their interconnection in the confined volume of the casing is taken as the desirable procedure.

Following assembly of the inductors and capacitors in the casing and the necessary attention to their respective leads as above described, these, and the discs 51 and its thereto-attached inserts 45 are positioned with respect to the casing 20 (Fig. 3) and a temporary plug or core 56 is inserted through the central aperture 57 of the disc 51. To provide proper concentric positioning of the disc and casing a reduced portion 59 of the plug 56 is adapted to fit snugly, but not permanently, within the interior of the extension 37.

Figure 2:
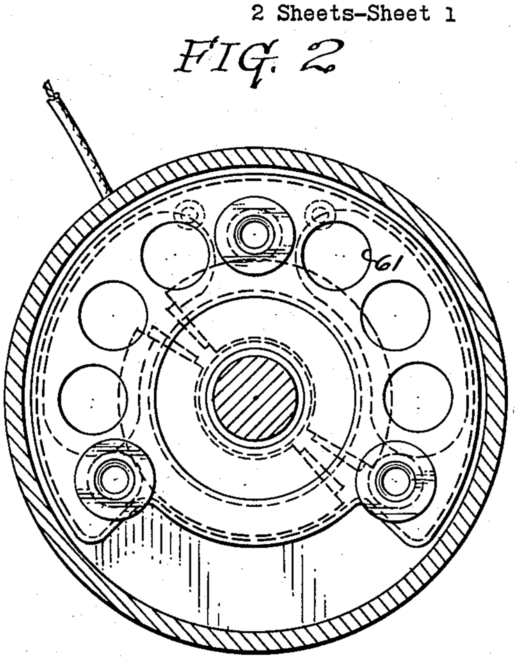
Fig. 2 is a cross section taken along the line 2—2 of Fig. 1.

While the parts are thus held in the proper relationship indicated in Figs. 3 and 4, a suitable potting compound in flowable form is introduced through one or more gates 61 in the disc 57 to fill the voids in the casing. Various easily available potting compounds may be used, e. g. one of the epoxy resins which are heat curable, thereby to provide an integrated, rigid assembly as seen best in Figs. 1 and 2.

It will be noted that the invention differs in at least one other important respect from other similar potted filter assemblies in that the casing 20 constitutes not only the mold for receiving the potting compound but remains a permanent part of the unit. In order to conserve cost the walls of the casing 20 may be made very thin, e. g. 0.025", and are therefore, to some degree, flaccid. However, their generally cylindrical configuration renders them self-supporting to some extent; at least the thickness is chosen to provide a casing which will serve as a mold for the potting compound used without deformation. Moreover, by providing such thin wall sections space occupancy allocated to the casing is maintained at a minimum. Upon hardening of the potting compound the entire assembly becomes rigid.

Following potting, including any necessary step of curing, the plug 56 may be withdrawn thereby to define a cylindrical space within the confines of the capacitors 39—39 for utilization in any desired manner, as for example, to fit around other parts of the motor.

Although the invention assembly has been exemplified as including the prongs 41 to facilitate electrical connections and mechanical support of the filter, it will be comprehended that these may be dispensed with. Principal support of the unit is effected through screws 65 passing through the plate 21 and entering the inserts 45.

While we have shown a particular embodiment of our invention, it will be understood, of course, that we do not wish to be limited thereto since many modifications may be made and we therefore contemplate by the appended claims to cover any such modifications as fall within the true spirit and scope of our invention.

We claim:

1. A radio noise filter assembly for installation in an electric motor having an outer shell and a shaft projecting from the armature within the shell to define an annular space therebetween comprising a casing having walls defining a pair of adjacent, concentric, toroidal annular compartments of different mean radius and including an annular wall joining said compartments, an inductor positioned in one compartment and a capacitor positioned in the other compartment, and terminal prongs secured to said annular wall.

2. A radio noise filter assembly for installation in an electric motor having an outer shell and a shaft projecting from the armature within the shell to define an annular space therebetween comprising a casing having a substantially toroidal first section and a cylindrical second section respectively defining a pair of compartments, an inductor in one of said compartments, a capacitor in the other of said compartments, a mass of hardened potting compound spacing and supporting said inductor and capacitor, and a cover plate united to said casing, said plate having threaded means for supporting the assembly.

3. A radio noise filter assembly for installation in an electric motor having an outer shell and a shaft projecting from the armature within the shell to define an annular space therebetween comprising a casing including a cylindrical section of one diameter, an annular section of smaller diameter, a radially-directed intermediate wall joining said sections, and an end wall for each section, each section defining a compartment, an inductor in one of said compartments and substantially concentric therewith, a capacitor in the other of said ompartments, and a mass of rigid material filling the voids between said inductor, capacitor and casing, and having a central bore for passage of the armature shaft.

4. An assembly in accordance with claim 3 further characterized by terminal prongs protruding from said intermediate wall for engagement with portions of a circuit of which the filter forms a part.

5. A radio noise filter assembly for installation in an electric motor having an outer shell and a shaft projecting from the armature within the shell to define an annular space therebetween comprising: a casing including a first cylindrical wall portion and a first annular end wall portion, said portions defining a first cylindrical compartment, said casing also including a second cylindrical wall portion of diameter larger than said first cylindrical wall portion, a second annular end wall portion cojoining said two cylindrical wall portions whereby to define a second cylindrical compartment, said assembly being adapted to be positioned in the annular space with the shaft extending through the central opening of said first annular end wall portion, an inductor positioned in one compartment and a capacitor positioned in the other compartment, and means for detachably securing the assembly to the motor.

6. An assembly in accordance with claim 5 wherein said inductor is arcuate and conformed substantially to the toroidal space which is defined between the motor shaft and the cylindrical wall portion in which the inductor is located.

7. An assembly in accordance with claim 5 wherein said capacitor is arcuate and conformed substantially to the toroidal space which is defined between the motor shaft and the cylindrical wall portion in which the capacitor is located.

8. An assembly in accordance with claim 5 wherein the motor field has terminals adjacent the assembly, said first annular end wall portion is provided with second terminals to connect to said first terminals upon installation of the assembly in the motor and said second terminals are electrically connected to said inductor and capacitor.

9. An assembly in accordance with claim 5 wherein said second compartment is interrupted peripherally to define a space for passage of conductors intermediate the assembly and the motor shell.

10. A radio noise filter assembly for incorporation with an electric motor having an outer shell and a shaft projecting from the armature within the shell to define an annular space therebetween, comprising a casing of material having no substantial shape-retaining quality defining an annular compartment; filter components and conductors therefor positioned in said compartment; a mass of rigid electrically insulating compound filling the voids intermediate the casing and components to provide support for the casing and an integrated rigid assembly; and a rigid annular disc forming an end wall of the casing and united therewith, said disc carrying means for support of the assembly.

References Cited in the file of this patent

UNITED STATES PATENTS

| | | |
|---|---|---|
| 726,963 | Michalke | May 5, 1903 |
| 1,894,724 | Apple | Jan. 17, 1933 |
| 1,911,128 | Apple | May 23, 1933 |
| 2,013,821 | Yost | Sept. 10, 1935 |
| 2,032,129 | Jackson et al. | Feb. 25, 1936 |
| 2,136,609 | Butterfield et al. | Nov. 15, 1938 |
| 2,382,857 | Camilli | Aug. 14, 1945 |

FOREIGN PATENTS

| | | |
|---|---|---|
| 878,806 | France | Nov. 2, 1942 |
| 593,761 | Great Britain | Oct. 24, 1947 |